(12) United States Patent
Allen et al.

(10) Patent No.: US 9,513,971 B1
(45) Date of Patent: Dec. 6, 2016

(54) MANAGING PROVISIONING FOR CLOUD RESOURCE ALLOCATIONS

(71) Applicant: International Business Machines Corporation, Armonk, NY (US)

(72) Inventors: Corville O. Allen, Morrisville, NC (US); Andrew R. Freed, Cary, NC (US)

(73) Assignee: International Business Machines Corporation, Armonk, NY (US)

(\*) Notice: Subject to any disclaimer, the term of this patent is extended or adjusted under 35 U.S.C. 154(b) by 0 days.

(21) Appl. No.: 15/046,516

(22) Filed: Feb. 18, 2016

Related U.S. Application Data

(63) Continuation of application No. 14/960,724, filed on Dec. 7, 2015.

(51) Int. Cl.
G06F 9/46 (2006.01)
G06F 9/50 (2006.01)
H04L 12/911 (2013.01)

(52) U.S. Cl.
CPC .......... *G06F 9/5083* (2013.01); *G06F 9/5016* (2013.01); *H04L 47/822* (2013.01)

(58) Field of Classification Search
None
See application file for complete search history.

(56) References Cited

U.S. PATENT DOCUMENTS

| | | | |
|---|---|---|---|
| 5,210,872 A * | 5/1993 | Ferguson | G06F 9/4887 718/102 |
| 8,289,984 B2 | 10/2012 | Sebastian et al. | |
| 8,429,276 B1 | 4/2013 | Kumar et al. | |
| 8,468,303 B2 | 6/2013 | Hayashi | |
| 8,650,564 B2 * | 2/2014 | Huang | G06F 9/45533 714/12 |
| 8,880,638 B2 | 11/2014 | Jeswani et al. | |
| 9,182,923 B2 * | 11/2015 | Skowron | G06F 3/0605 |
| 2011/0213885 A1 | 9/2011 | Kelkar et al. | |
| 2012/0254532 A1 | 10/2012 | Hayashi | |
| 2013/0080619 A1 | 3/2013 | Assuncao et al. | |
| 2015/0058475 A1 * | 2/2015 | Earl | H04L 47/741 709/224 |
| 2015/0081908 A1 | 3/2015 | Tan et al. | |

FOREIGN PATENT DOCUMENTS

WO  2012050772 A1  4/2012

OTHER PUBLICATIONS

Mell et al., "The NIST Definition of Cloud Computing", National Institute of Standards and Technology, Special Publication 800-145, Sep. 2011, pp. 1-7.
IBM: List of IBM Patents or Patent Applications Treated As Related (Appendix P), May 6, 2016, pp. 1-2.
Pending Application No. AUS920150046US1, filed on Dec. 7, 2015, titled "Managing Provisioning for Cloud Resource Allocations,", pp. 1-36.

\* cited by examiner

*Primary Examiner* — Mengyao Zhe
(74) *Attorney, Agent, or Firm* — Reza Sarbakhsh

(57) ABSTRACT

Resource provisioning to a process in a distributed computing system, such as a cloud computing system. An instruction to provision a resource is received. Portions of the resource are provisioned to the process as they become available, and prior to all portions becoming available, based on determining that the provisioning speed is greater than or equal to the use speed for the resource. If the use speed is faster, it may be actively slowed down.

1 Claim, 6 Drawing Sheets

---

Receive provisioning instruction. 202

↓

Estimate provisioning speed and use speed. 202A

↓

Reduce use speed. 206

MANAGING PROVISIONING FOR CLOUD RESOURCE ALLOCATIONS

BACKGROUND

The present disclosure generally relates to cloud computing, and more specifically to provisioning resources in a cloud computing environment.

Resource allocation in a cloud computing environment takes time. A user or a process requesting the resource may have to wait before performing a series of tasks before the allocation completes. In one example, a user cannot begin working with a virtual machine (VM) image designated under provisioning to the user until the entire VM image is prepared and allocated to that user. In a further example, a user application running on the cloud may be assigned a default amount of memory. Through increased use, the application may require additional memory, which the cloud must provision to the application. While the provisioning is in progress, the user application does not have access to the additional memory. The application's processing either fails, or stalls, until the resource allocation completes.

BRIEF SUMMARY

Embodiments of the invention provide for a method, system, and computer program product, for provisioning resources in a distributed computing system.

Embodiments of the invention receive a provisioning instruction to provision a resource in the distributed computing system. The provisioning instruction is associated with a set of provisioning tasks for completion. At least one provisioning task is executed, prior to all portions of the resource becoming available for provisioning. Executing the at least one provisioning task allocates at least one portion of the resource to the process.

In an embodiment, two speeds are estimated: a provisioning speed corresponding to a speed at which the resource is expected to be allocated based on the provisioning instruction; and a use speed corresponding to a speed at which the resource is expected to be used by a process. Executing at least one provisioning task is further based on the estimated provisioning speed being faster than, or equal to, the estimated use speed.

In an embodiment, two speeds are estimated: a provisioning speed corresponding to a speed at which the resource is expected to be allocated based on the provisioning instruction; and a use speed corresponding to a speed at which the resource is expected to be used by a process It is determined that the estimated provisioning speed is slower than or equal to the estimated use speed. At least one instruction is executed to reduce the use speed to be equal to or slower than the provisioning speed.

DETAILED DESCRIPTION

Embodiments of the invention generally provide resource allocation management functions in a distributed computing environment.

Figure 1A:
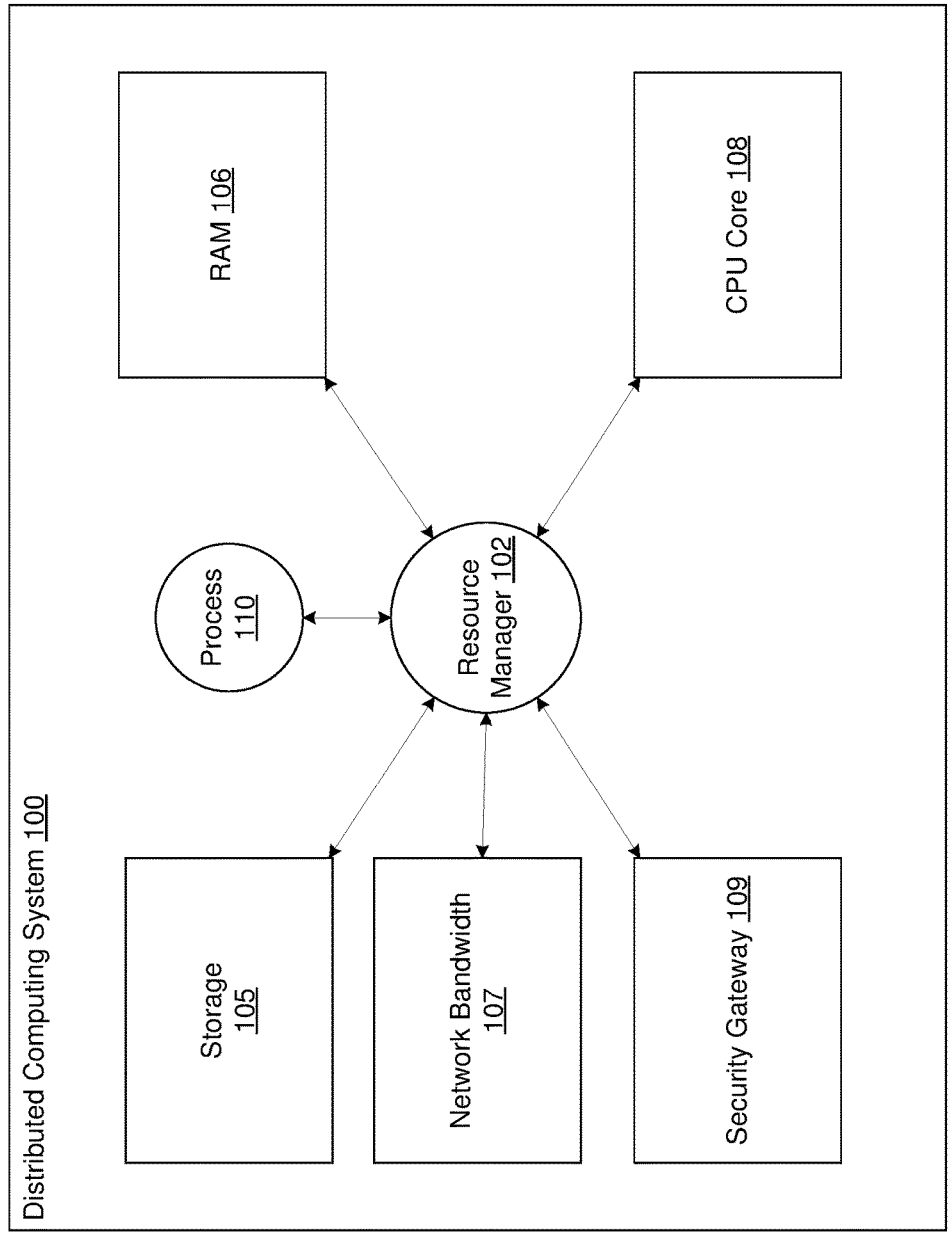
FIG. 1A is a block diagram of an illustrative distributed computing system, according to an embodiment of the invention.

FIG. 1A is a block diagram of an illustrative distributed computing system 100, according to an embodiment of the invention. Distributed computing system 100 includes operatively interconnected physical and virtual computing nodes, including cloud computing devices and cloud computing resources (hereinafter, "devices" and "resources"). Additional details of the structure of an exemplary distributed computing system 100 are described in greater detail in connection with FIGS. 6-7, below.

According to an embodiment of the invention, distributed computing system 100 includes a set of resources. Illustrative and non-limiting examples of resources include resource types such as storage 105, random access memory (RAM) 106, network bandwidth 107, central processing unit core 108, and security gateway 109.

Each resource type may have an instance. For example, there may be multiple instances of storage 105 corresponding to multiple storage resources. As a further example, there may be multiple CPU cores 108, each of which may be described as an instance of the CPU core 108 resource type.

Each resource may be a physical resource or a virtual resource, and each resource may be divisible into constituent portions. For example, a storage 105 resource may include multiple storage disk sectors. A RAM 106 resource may include multiple sets of address blocks (the size of these blocks may be predefined). A network bandwidth 107 resource may have multiple speed ranges, or maximum bandwidth. A security gateway 109 resource may include multiple security gateway application resources that a process 110 running on the cloud may invoke to facilitate security functions.

Distributed computing system 100 further includes a resource manager 102. Resource manager 102 may be a computer program having instructions executable on a central processing unit of a computing device in distributed computing system 100. The program instruction may execute one or more methods for provisioning cloud computing resources to a process 110, according to embodiments of the invention, such as the methods described in connection with FIGS. 2-4, below.

Resource manager 102 generally performs resource preparation and allocation functions based on receiving a resource allocation instruction (which may be, for example, from a user process, a user application, a system process, or a system application). The resource allocation instruction may be generated by distributed computing system 100 in response to detecting a need for allocating a new resource to a process 110, or to increase or modify a resource allocation compared to a previous allocation. The resource allocation instruction may also be generated by distributed computing system 100 in response to receiving a resource allocation request from a process 110, such as a user application.

For example, where the resource allocation instruction is for allocating storage 105 resource to a process 110, resource manager 102 may prepare storage disk space by performing one or more of the following illustrative operations: formatting, reformatting, partitioning, and erasing. In a related example, a disk sector is a portion of the storage 105 resource, and formatting the disk sector is a provisioning task.

As a further example, where the resource allocation instruction is for allocating RAM 106, resource manager 102 may prepare RAM address blocks by erasing their contents. In a related example, preparing each address block is a portion of the RAM 106 resource, and erasing the contents of a given RAM address block is a provisioning task.

As a further example, where the resource allocation instruction is for allocating network bandwidth, resource manager 102 may prepare network IP addresses by updating IP address tables or flushing DNS caches. In a related example, preparing an IP address, or a set of IP addresses, is a portion of the network bandwidth 107 resource, and updating an IP address table or flushing a DNS cache is a provisioning task.

As a further example, where the resource allocation instruction is for allocating CPU cores 108, resource manager 102 may prepare by consolidating jobs from lightly used CPUs, so that the CPUs become available to use for new processes. In a related example, a CPU core is a portion of the CPU core 108 resource, and freeing a lightly used CPU is a provisioning task.

As a further example, where the resource allocation instruction is for allocating security gateway 109 processes, resource manager 102 may prepare by installing new security gateway nodes. In a related example, a security gateway node is a portion of the security gateway 109 resource, and installing a node is a provisioning task.

The Resource manager 102 allocation functions include provisioning one or more prepared portions of a resource to the process 110 corresponding to the provisioning instruction.

Figure 1B:
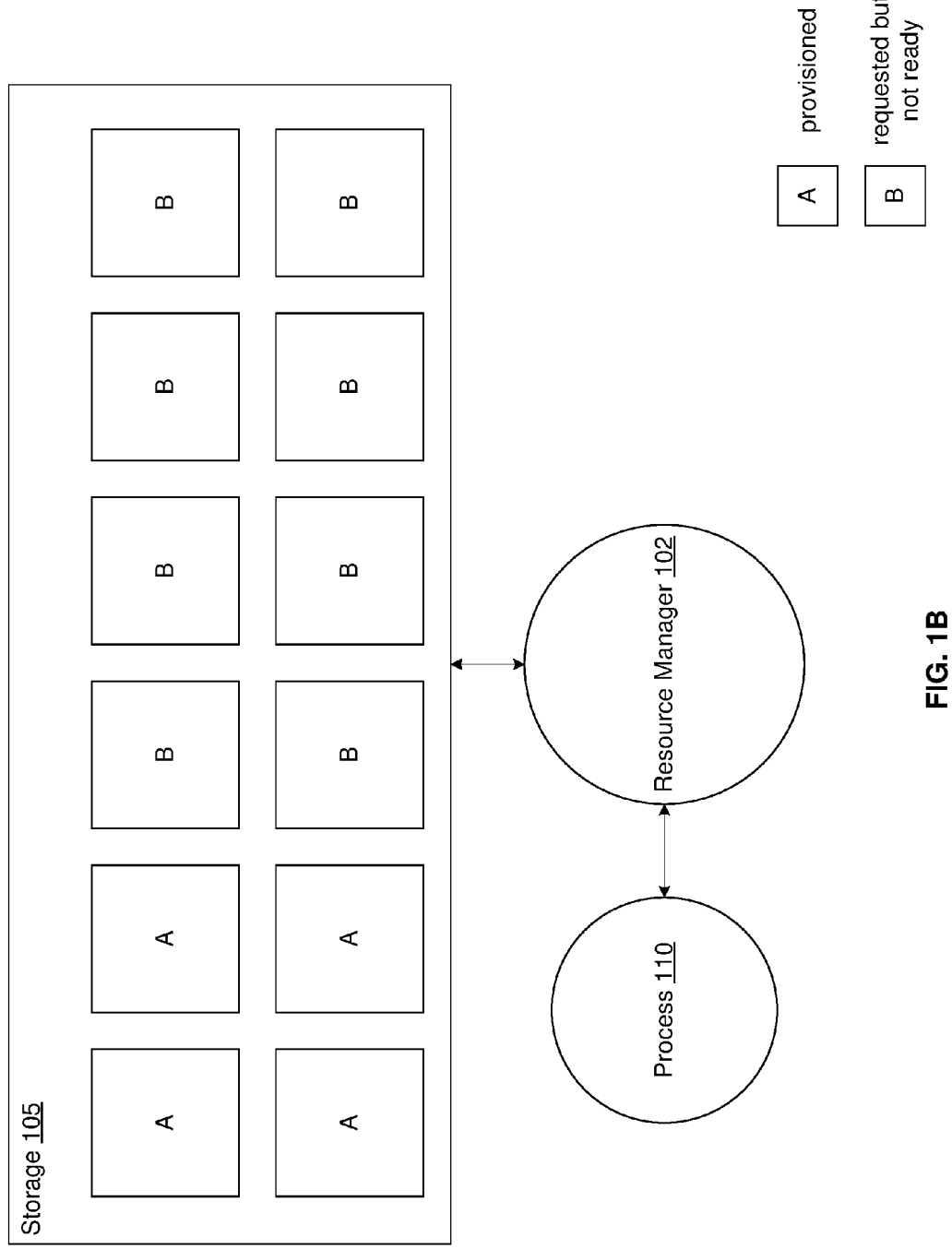
FIG. 1B is an illustrative block diagram of a resource manager, a process, and portions of a storage resource, according to an embodiment of the invention.

FIG. 1B is a functional block diagram of select components of distributed computing system 100 of FIG. 1A, according to an embodiment of the invention. Resource manager 102 receives a provisioning instruction to provision (12) disk sectors in storage 105 to process 110. At some time between immediately receiving the instruction, but prior to all disk sectors becoming available for provisioning, resource manager 102 may determine that four disk sectors (each disk sector is a portion of storage 105), designated as (A), are ready for provisioning, while eight other disk sectors designated by (B) are not immediately available for provisioning. Resource manager 102 provisions the (A) disk sectors to process 110 without waiting for any of the (B) disk sectors to become available. Form the process' 110 perspective, it appears that all disk sectors have been allocated, even though the provisioning process is ongoing in the background.

With continued reference to FIG. 1B, in a related embodiment, if resource manager 102 determines that process 110 will use disk sectors faster than they can be provisioned, resource manager 102 may slow down process' 110 execution.

Figure 2:
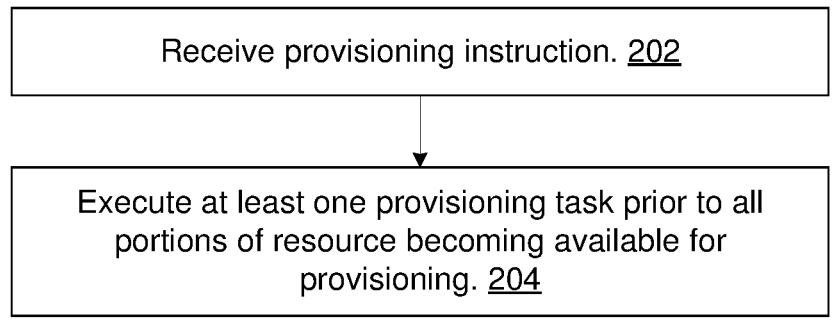
FIGS. 2-4 are flow charts of methods for provisioning cloud computing resources to a process running on a distributed computing system, according to an embodiment of the invention.
Figure 3:
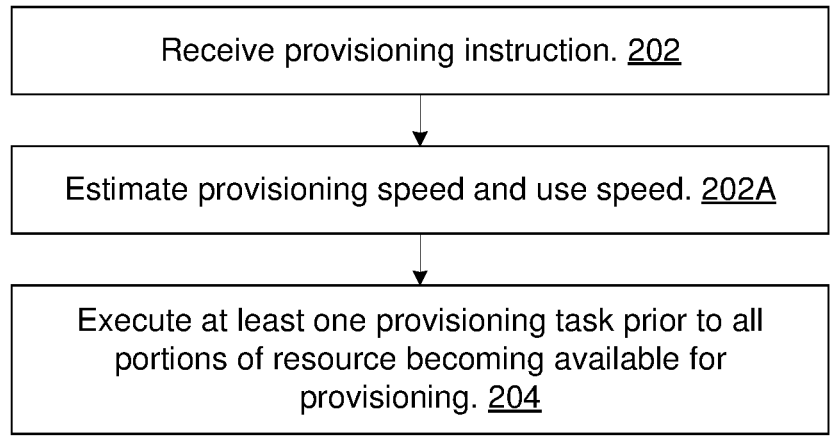
Figure 4:
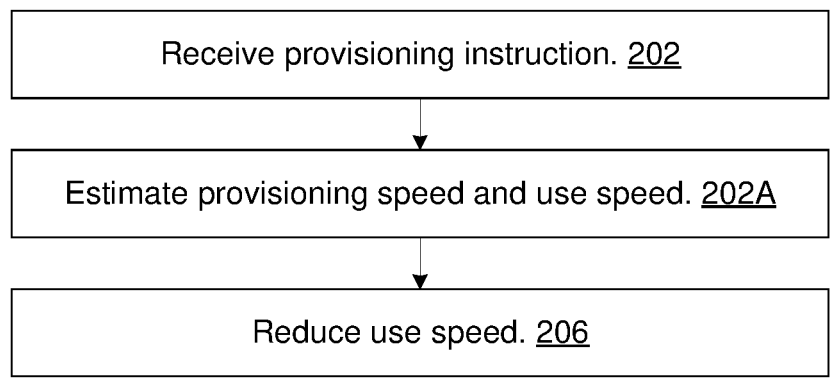

FIGS. 2-4 are flow charts of methods for provisioning cloud computing resources to a process 110 running on a distributed computing system in a distributed cloud computing environment, according to embodiments of the invention. For example, these methods may be executed on distributed computing system 100, via programming instructions of resource manager 102.

Referring now to FIGS. 1A and 2, resource manager 102 may receive an instruction to provision a resource to a process 110 (at 202). The provisioning instruction may be associated with a set of provisioning tasks for completion. A provisioning task refers to a computing operation that is performed as part of an overall process to provision a resource to a process 110.

In one example, hereinafter referred to as EXAMPLE 1, distributed computing system 100 may detect that a given user application requires more storage 105 than is presently assigned to the application. Distributed computing system 100 may communicate an instruction to resource manager 102 to provision five additional disk sectors (storage 105) to the application. This provisioning process may include, for example, the following provisioning tasks: identifying five disk sectors suitable for the application; assign the identified disk sectors to the application; if an identified disk sector requires formatting, format the disk sector before assigning it to the application.

Based on the provisioning instruction, resource manager 102 executes at least one provisioning task prior to all portions of the resource becoming available for provisioning (at 204). Executing at least one provisioning task allocates at least one portion of the resource to the process 110. One of the consequences of this function is that a process 110 need not wait for all portions of a resource to become available before the process 110 can begin using the resource. The process 110 may begin using the resource, and additional provisioning tasks may execute in the background to prepare additional portions, without affecting the application's use of the provisioned portions.

Continuing with EXAMPLE 1, resource manager 102 may determine that although five disk sectors are necessary to satisfy the provisioning instruction, only three disk sectors are immediately available. The two additional disk sectors identified or selected for provisioning to the application may require formatting prior to the provisioning. Resource manager 102 provisions (at 204) at least one available disk sector to the application, even though fewer than all five disk sectors are available. Consequently, from the application's perspective, access to additional storage 105 is seamless, and the application can begin using the additional disk sectors immediately. While the application uses the provisioned disk sector, resource manager 102 may format the two additional disk sectors that require formatting prior to provisioning. Resource manager 102 may assign each of these two additional disk sectors to the application as each becomes available, without the need to wait for all formatting functions to complete.

Referring now to FIGS. 1A and 3, resource manager 102 may receive an instruction to provision a resource to a process 110 (at 202), in the same manner as described in connection with FIG. 2. Resource manager 102 may estimate a speed at which the resource is expected to be allocated to the process 110, and the speed at which the process 110 is expected to use the allocated resource (at 202A). In one embodiment, the provisioning speed, the use speed, or both, may be determined in part by the network speed between two nodes in distributed computing system 100, where the resource is on one of the nodes, and the application is on the other node.

According to the illustrated embodiment, the execution of at least one provisioning task prior to all portions of the resource becoming available for provisioning (at 204), as described above, is conditional on resource manager 102 determining (at 202A) that the speed at which resource manager 102 can provision portions of the resource is greater than, or equal to, the speed at which the process 110 can use those allocated portions.

In a related embodiment, the conditional determination may be based on resource manager 102 determining (at 202A), that the speed at which resource manager 102 can provision portions of the resource is greater than the speed at which the process 110 can use those allocated portions by more than a threshold value.

In one embodiment, the estimates may be based on predefined estimate values, where a provisioning task for a given portion of a given resource is defined to require a specified amount of time ($t_1$) to prepare, and a defined amount of time ($t_2$) to consume. In another embodiment, the estimates may be based on measured time values during successive provisioning and use operations for a resource. In another embodiment, the estimates may be based on various measurements across distributed computing system 100, such as existing or scheduled workloads.

Continuing with EXAMPLE 1, resource manager 102 may estimate that it can provision the five disk sectors to the application at one disk sector per time unit ($t_1$), and that once a disk sector(s) is provisioned to the application, the application can use the provisioned disk sector(s) at ($t_2$), where ($t_1$)≥($t_2$). In this case, resource manager 102 provisions the available disk sectors to the application. Consequently, the application may begin using the provisioned disk sectors. However, if resource manager 102 determines that ($t_1$)<($t_2$), resource manager 102 may take actions other than provisioning at least one disk sector to the application.

Referring now to FIGS. 1A and 4, resource manager 102 may receive an instruction to provision a resource to a process 110 (at 202), in the same manner as described in connection with FIGS. 2 and 3. Resource manager 102 may estimate a speed at which the resource is expected to be allocated to the process 110, and the speed at which the process 110 is expected to use the allocated resource (at 202A), in the same manner as described in connection with FIG. 3.

According to the illustrated embodiment, resource manager 102 may further determine (at 202A) that the estimated provisioning speed is slower than or equal to the estimated use speed. Based on this determination, resource manager 102 may execute at least one instruction to reduce the use speed to be equal to or slower than the provisioning speed (at 206). Consequently, although the process 110 may see a slowdown in its execution, the resource allocation process maintains a seamless appearance from the process' 110 perspective. The provisioning process will not stall or fail; it merely is delayed.

In a related embodiment, resource manager 102 may periodically re-estimate the provisioning speed and the use speed, and take action according to various embodiments of the invention based on those re-estimated values. These actions may include, for example, those described in connection with FIG. 3.

Continuing with EXAMPLE 1, resource manager 102 may estimate that it can provision the five disk sectors to the application at one disk sector per time unit ($t_1$), and that once a disk sector(s) is provisioned to the application, the application can use the provisioned disk sector(s) at ($t_2$), where ($t_1$)≤($t_2$). In this case, resource manager 102 executes at least one instruction to slowdown the application's use speed, for example, by reducing the application's allotted bandwidth at which it may transfer data to provisioned disk sectors for storage. Consequently, although the application may experience a slowdown in its execution, it does not fail. This is in contrast to a scenario where using resources faster than they are provisioned may generate an error and result in the application's termination or an unstable application state.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows. Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows. Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
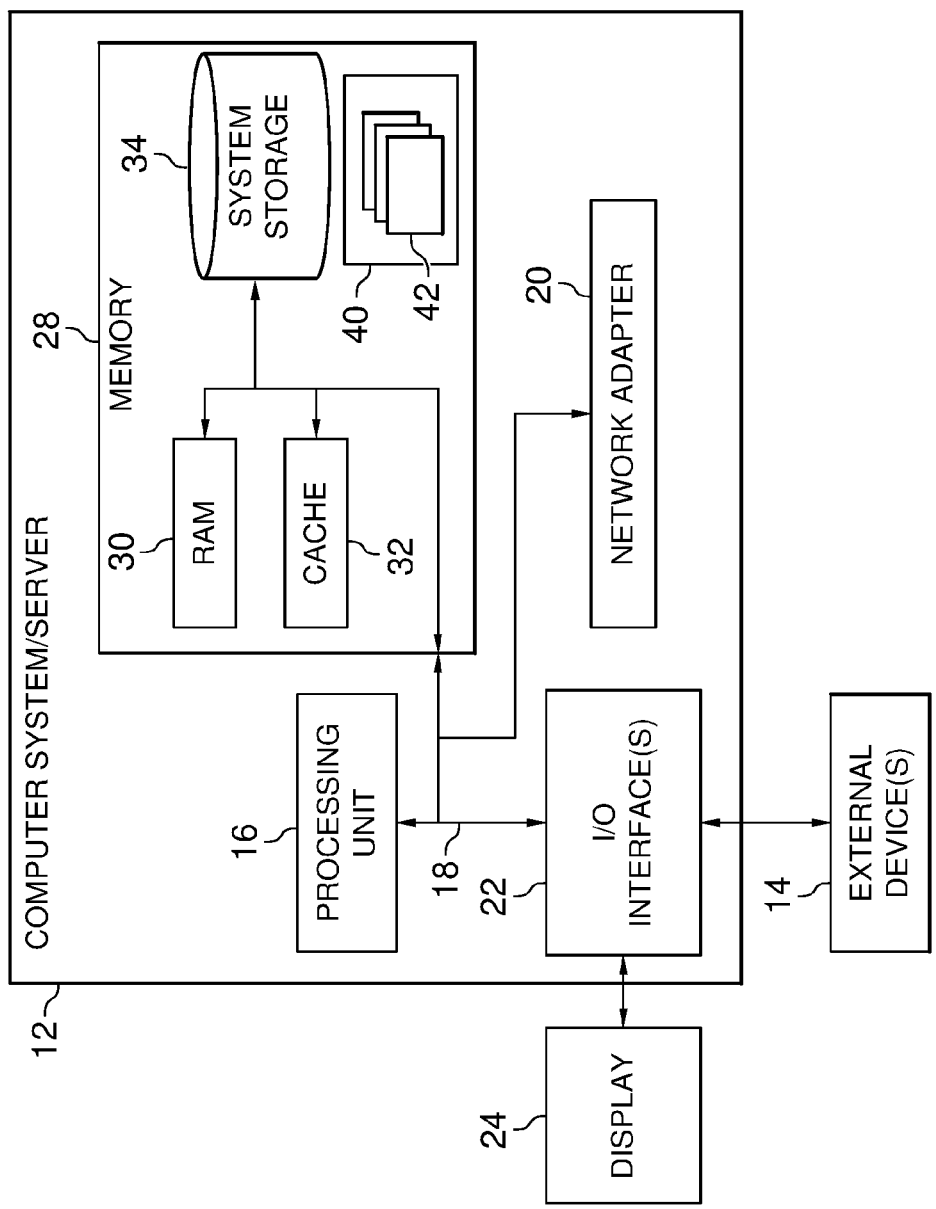
FIG. 5 is a block diagram of a general purpose computer, according to an aspect of the invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
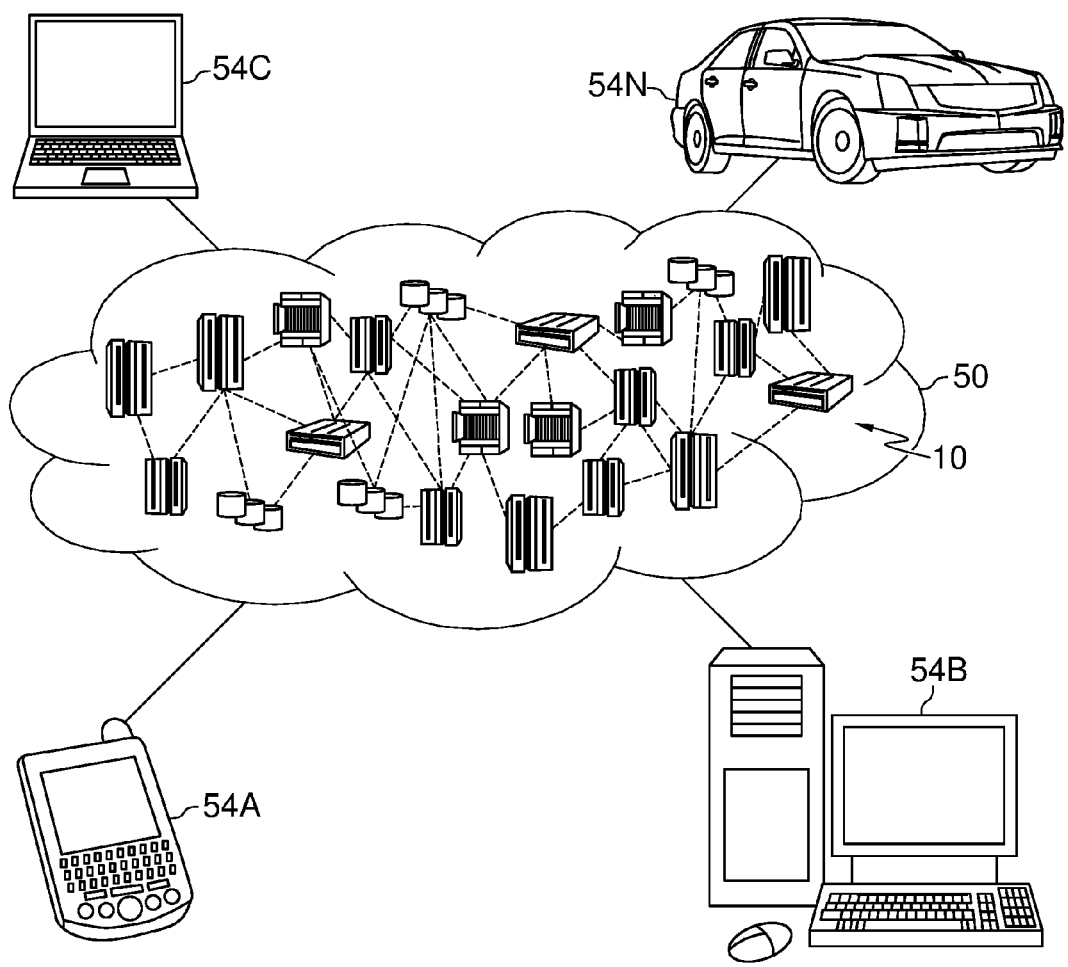
FIG. 6 is a block diagram of an illustrative cloud computing environment, according to an aspect of the invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
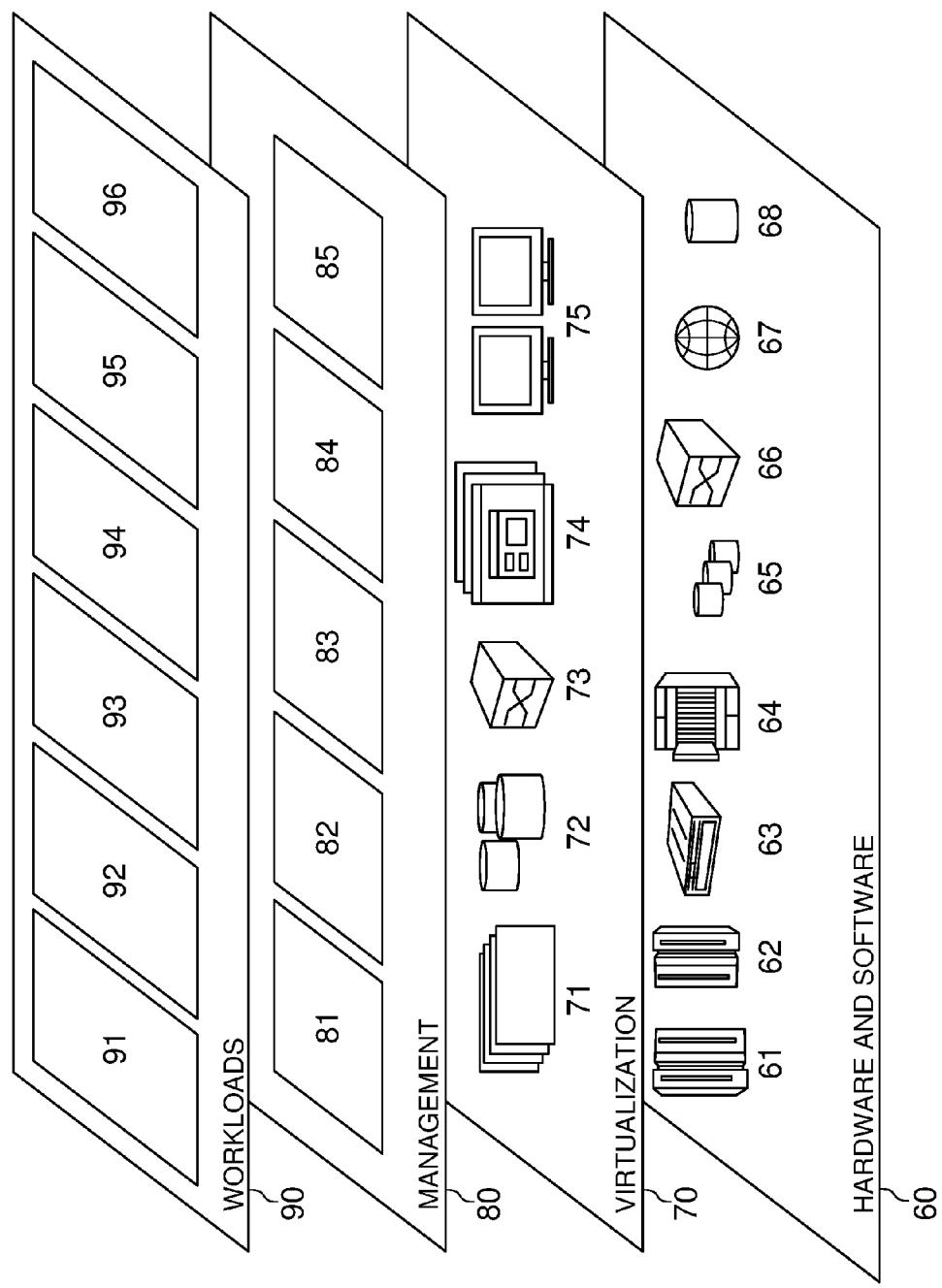
FIG. 7 is a block diagram of functional layers of the illustrative cloud computing environment of FIG. 6, according to an aspect of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource provisioning services 96.

In a related embodiment, cloud migration services may be performed as part of management layer 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for provisioning resources in a distributed computing environment, comprising:
   receiving a provisioning instruction to provision a resource in the distributed computing environment, the provisioning instruction being associated with a set of provisioning tasks for completion;
   monitoring a provisioning speed corresponding to a speed at which the resource has been allocated based on the provisioning instruction;
   monitoring a use speed corresponding to a speed at which the resource has been used by a process; and
   determining whether the provisioning speed is faster than or equal to the use speed, or slower than the use speed; and
   executing at least one provisioning task, prior to all portions of the resource becoming available for provisioning, whereby executing the at least one provisioning task allocates at least one portion of the resource,
   executing at least one instruction to reduce the use speed to be equal to or slower than the provisioning speed if it is determined that the provisioning speed is slower than or equal to the use speed,
   wherein the provisioning instruction is received from at least one of a user process, a user application, a system process, and a system application, and
   wherein the resource includes one or more of storage memory, random access memory (RAM), network bandwidth, central processing unit (CPU) core, and security gateway.

* * * * *